Patented Jan. 14, 1936

2,027,948

UNITED STATES PATENT OFFICE 2,027,948

ADSORBENT

Herbert J. Wollner, Brooklyn, and John V. Shinn, Flushing, N. Y., assignors to General Chemical Company, New York, N. Y., a corporation of New York No Drawing. Application November 4, 1932, Serial No. 641,224

18 Claims. (Cl. 252—2)

This invention relates to an adsorbent silica, and to the method of producing the same. The invention is particularly directed to a process for preparing from clays and silicious materials an active silica for use in purifying, filtering, bleaching and decolorizing oils, solutions and gases.

Several processes for making active earths and various decolorizing and purifying agents have been proposed. Such substances previously employed in the arts may generally be considered as falling within two broad classes. The first of these includes earths which are found in their natural state in such condition as to be substantially ready for use. Fuller's earth and bauxite are two known examples of this type of material. A second generic class, which may be regarded broadly as directed to artificial substances, includes acid treated clays, and gels of various kinds generated, as a rule, by processes involving reactions between soluble silicates and acids. Of the acid treated clays, substances resulting from acid treatment of bentonite and montmorillonite are representative, and gels, such as silica gel, are examples of the second type. There is a wide difference between the substances of each broad class both with respect to initial cost of manufacture and their efficiency as decolorizing and purifying agents.

The present invention is directed to a process for making an active silica having a greater efficiency than known purifying and decolorizing agents of either the first or second classes, but yet of such nature that the initial cost of manufacture is greatly reduced.

It is one of the principal objects of the invention to produce an adsorbent silica from clays and silicious materials which has a marked efficiency as compared with adsorbent materials of somewhat similar characteristics produced from related raw materials. A further object of the invention lies in the provision of a process of such nature that the cost of production of the improved adsorbent is materially reduced. The invention particularly contemplates the provision of a process in which the reagents utilized are regenerated in substantially quantitative amounts with the result that the major cost of the adsorbent silica produced thereby lies chiefly in the raw materials.

A further object of the invention is directed to the provision of a process by which the field of raw materials serving as a source of the silica in the finished product is greatly extended. The invention contemplates broadly the utilization of clays and silicious materials of different character than heretofore employed, or in other words, looks to the use of clays having little or no original adsorbent or purifying properties in untreated condition as a source of silica for the improved product. Further, it is another object of the invention to provide a process by which a superior product can be made from silicious materials constituting the tailings or waste of chemical processes involving the treatment of clays and related silicates and other mineral substances containing substantial amounts of silica and in which processes the silica content is partially or wholly an unsought for constituent. Accordingly, the invention generally is directed to the production of a superior adsorbent silica from sources of raw materials not heretofore employed for the purpose, or from the silicious waste of various chemical processes, and to the method of making the improved product by a process in which the reagents utilized are substantially regenerated in their entirety.

Where the silicous material employed is in the raw condition, i. e., substantially in the original form as mined as a metal silicate, the invention comprises the drying, crushing and calcination of the raw silicious material. Following calcination, the material is digested in a strong mineral acid, and the acid soluble constituents then separated from the silicious residue by washing. The silicious residue is calcined, after which operation the residue is digested with the aid of heat in an alkaline solution in which the silica forming the active component of the improved adsorbent becomes dissolved. Solid undissolved residues are preferably separated from the solution, while maintaining the digest mixture substantially at the elevated temperature of digestion. The active silica constituting the product of the invention is then precipitated from the alkaline solution by rapid cooling thereof in a manner hereinafter particularly specified. In accordance with the invention, it has been found that the rate of cooling of the hot solution has an important bearing on the physical characteristics and adsorbent properties of the final product. The adsorbent thus formed is separated from the solution and washed by alternate re-pulping and filtration to remove sustantially all of the remaining sodium carbonate solution from the adsorbent. The washed silica is then subjected to a hereinafter detailed acid treatment to render the product particularly adaptable for the decolorization of non-acid treated oils. Subsequent to the acid treatment the silica is suitably dried.

In instances where the silicious material employed is the by-product of a chemical process involving the acid treatment of a silicate and in which acid soluble substances have been separated and removed from the silica, the silicious by-product may be directly subjected to digestion in the alkaline solution and to the subsequent treatment, the initial acid treatment being omitted, provided the prior chemical process has been such that the silicious product or by-product thereof is in suitable physical condition, as will be hereinafter specified, for the alkaline digestion.

One mode of carrying out a preferred embodiment of the invention is as follows: The raw material employed may be a flint clay, for example kaolinite, of approximately the following composition:

| | Per cent |
|---|---|
| Alumina ($Al_2O_3$) | 40 |
| Silica ($SiO_2$) | 45 |
| Water ($H_2O$) | 13 |
| Titania, iron oxides, alkalies, etc. | Balance |

The clay is dried, crushed to a suitable degree of fineness, and then calcined at a temperature of approximately 650° C. Following calcination, the clay is cooled and ground. The finely ground calcined clay is then digested with 40% sulfuric acid for a period sufficient to facilitate the dissolution by the acid of substantially all the readily acid soluble substances. In this instance, a large proportion of alumina may be liberated, taking the form of aluminum sulfate. To facilitate settling and separation of the solid residue from the aluminum sulfate solution, a small quantity of a suitable coagulant, for example glue, may be introduced into the digest solution as is known in settling operations of this general nature. The aluminum sulfate and other acid-soluble substances are then separated from the solid residue by decantation, filtering or otherwise, and the acid-treated clay is washed with water. After washing, and drying the residue at about 100° C., the silicious clay residue remaining may analyze substantially as follows:

| | Per cent |
|---|---|
| Silica ($SiO_2$) | 76 |
| Alumina ($Al_2O_3$) | 11 |
| Titania, iron oxides, loss on ignition, etc. | Balance |

The silicious clay residue is then calcined with frequent rabbling at a temperature of preferably around 600° C. for about one hour to oxidize and remove from the clay residue included organic substances which, as hereinafter noted, may have a deleterious effect on the operation of certain phases of the process. Calcination effects removal of substantially all of the moisture and organic matter from the residue, and may increase the silica content to about 83%, and the alumina content to around 12%. After calcination the residue is then ground so that substantially all of the material passes a 300 mesh screen. Approximately one-half the silica of the clay residue appears to be soluble in a hot sodium carbonate solution. A digest solution comprising two parts of the ground clay residue to about 8 parts of sodium carbonate (about one part soluble silica to about 8 parts sodium carbonate) in the form of a 20% solution with a specific gravity of about 1.20 at 25° C., is prepared and the mixture boiled at the boiling temperature of around 104–105° C. for about one hour. During the digestion, the active component of the improved adsorbent becomes dissolved in the sodium carbonate solution.

On completion of the digestion operation, the undissolved residues are preferably separated from the solution in any suitable manner such as by filtration or decantation. Irrespective of the method employed for separating the solution and the undissolved residues, according to the preferred form of the invention, the solution is maintained substantially at the same elevated temperature of digestion while making such separation. After the separation of the solid residues from the solution, the residues are preferably washed to recover soluble silica and carbonate solution, and the wash liquor returned to the process, preferably to a succeeding batch. During digestion, it will be found that the original clay residue is reduced approximately 50% by weight.

The clear filtrate remaining after digestion and separation of the mud from the solution, while in the hot state apparently contains sodium silicate, sodium bicarbonate and sodium carbonate, some carbon dioxide having been given off during digestion. The filtrate or decanted liquor is then, in accordance with one important phase of the present invention, rapidly cooled. This cooling may be effected by passing the liquor through a tube cooler or heat exchanger in such manner that the temperature of the sodium carbonate-silica solution is reduced from about 104–105° C., the approximate boiling temperature, to about 30° C. The apparatus employed should preferably be such that the time interval for cooling a given unit of the solution is about two seconds, that is, the cooling operation is so conducted that cooling of each portion of the liquor from about 104° C. to about 30° C., is accomplished in approximately two seconds. The cooled liquor discharged from the cooler is allowed to stand undisturbed in a suitable receiver for about an hour. The rapid cooling of the carbonate-silica solution effects separation of the silica from the solution as a gelatinous mass which at the end of the interval noted, e. g. one hour, is quite stiff. During the period in which the cooled solution is permitted to stand, carbon dioxide may be added to the solution in quantities sufficient to compensate for that given off during digestion. This addition of carbon dioxide furthers the complete precipitation of the silica from the solution. At this stage the mass is constituted substantially as follows:

| | Per cent |
|---|---|
| Sodium carbonate | 19.5 |
| Water | 78.1 |
| Silica | 2.4 |

The mass is now filtered by any suitable means and the cake obtained may contain

| | Per cent |
|---|---|
| Sodium carbonate | 19 |
| Water | 76 |
| Silica | 5 |

In order to bring about a substantially complete removal of sodium carbonate solution from the active silica, according to the preferred mode of operation, the above silica cake is broken up into approximately one-half inch lumps, and repulped in about five times its weight of water. The pulp is stirred gently for about one-half hour, and the slurry is then filtered, the cake containing approximately

| | Per cent |
|---|---|
| Sodium carbonate | 3.2 |
| Water | 89.3 |
| Silica | 7.5 |

The cake thus obtained is again broken up and re-pulped in about five times its weight of water. Following moderate agitation for about one-half hour the slurry is filtered, and the resulting cake may consist of

|  | Per cent |
|---|---|
| Sodium carbonate | .5 |
| Water | 89.5 |
| Silica | 10.0 |

Irrespective of the number of water washings to which the silica is subjected, the washing operation as a whole should be preferably such as to cause removal of sodium carbonate to an extent so that the final product after acidification and drying contains not more than about 5% soluble salts such as sodium sulfate. It appears that the presence of greater amounts of soluble salts tends to reduce the adsorptive properties of the product.

The cake containing the above noted small quantity of sodium carbonate is now broken up and re-pulped in about five times its own weight of water, and sufficient acid, sulfuric acid for example, is added to the slurry to substantially completely neutralize the slurry. After the slurry has been neutralized, according to the preferred embodiment of the invention, acid is again added to the slurry in quantities such that when the silica is subsequently separated from the slurry and dried, the final product contains about 6 to 8% acid. For this purpose the slurry is made about 1.13% acid. It has been found that in order to obtain as intimate dispersion as possible of the acid throughout the silica, the slurry, after addition of the acid thereto, should be gently agitated from time to time, and to further distribution of acid throughout the material, the mass is aged by permitting the same to stand for some time, for example from twelve to twenty-four hours. The period of time required for aging depends on the rate of penetration of the acid and would thus vary with the temperature and with the size of the active silica lumps in the slurry. It has further been found that a relatively long period of contact between the acid solution and the silica is desirable to permit penetration of the silica by the acid to neutralize any alkali retained within the particles of silica, to leach out sulfate, and obtain thorough distribution in the silica of acid from the solution. The procedure described effects intimate contact between acid and silica without any tendency to break down the physical structure of the silica particles. When thorough absorption of acid in the silica is obtained, the slurry is filtered, and the resulting cake analyzes substantially as follows:

|  | Per cent |
|---|---|
| Water | 86.3 |
| Sodium sulfate | .1 |
| Sulfuric acid | 1.1 |
| Silica | 12.5 |

The cake is then dried by heating to about 95° C. until on further heating at this temperature, additional loss of weight becomes substantially negligible. In the particular example, the dried product shows a loss on ignition of about 20%, and is constituted approximately as follows:

|  | Per cent |
|---|---|
| Water | 12.7 |
| Sulfuric acid | 7.2 |
| Sodium sulfate | .8 |
| Silica | 79.3 |

The product, appearing to consist of clear or rather transparent particles with sharp edges and of more or less even fracture, is ground to pass 100 mesh and is then ready for use.

In the initial acid digestion of the clay or other silicious material, any suitable acid such as sulfuric, hydrochloric, or nitric acids, or any acid strong enough to effect the removal of alumina may be employed.

Calcination of the original raw silicious material prior to acid digestion, while not essential, is preferable to aid in the dissolution of the raw material. However, this initial calcination should not be confused with the calcination or oxidation step just prior to the digestion of the clay residue of the acid digestion in the alkaline solution. The final calcination has a function separate and distinct from the initial calcination prior to the acid digestion, in that the second calcination acts to substantially completely eliminate from the silicious material organic material which may have originated in the raw silicious material, or may have its source in the coagulants employed to facilitate settling after the acid digestion, or other organic material which may have worked into the batch during processing, for example in the form of oily drips from the machine. The duration of the final calcination may vary from a few minutes to something over an hour. Likewise, the temperature of the calcination may vary, and temperatures ranging from 300° C. to 750° C. but preferably as noted about 600° C. may be employed.

The concentration of the sodium carbonate solution may be varied over a considerable range. It appears that dissolution of the active silica is more complete in a relatively concentrated solution, although such concentration may range from less than 10 to about 24%. A potassium carbonate solution, or a solution comprising a mixture of sodium and potassium carbonates of suitable concentration may be employed.

Where the product is to be used as a purifying agent for some types of oils and solutions, it is preferred to remove undissolved residues from the alkaline solution, and to this end separation of the solution and the undissolved residues or mud is, as noted, preferably effected while the solution is hot, and at a temperature not substantially less than that of digestion. In some instances, however, it may be desirable to effect precipitation of silica from the alkaline solution in the presence of the undissolved residues. During precipitation, the mass may be agitated so as to form intimate admixture of undissolved residues and precipitated silica, the former apparently acting as a carrier for the active silica. Products of this kind may be used to advantage for treatment of certain types of oils.

The filtrate obtained on separation of the insoluble matter unattacked by the digestion with the carbonate is a clear solution, and apparently contains principally, while hot, sodium silicate ($Na_2SiO_3$), sodium bicarbonate ($NaHCO_3$), and sodium carbonate ($Na_2CO_3$). The digestion reaction may be explained on the basis that the sodium carbonate reacts with the silica of the clay residue forming sodium silicate and sodium bicarbonate. The latter in the process of boiling incurs a small loss of carbon dioxide as previously noted. Following rapid cooling of the solution, the silica of the sodium silicate precipitates re-forming sodium carbonate in the solution.

In accordance with the present invention, it has been found that the rate at which the cooling of the sodium carbonate-silica solution is effected has a pronounced influence on the physical structure and adsorbent properties of the final product. Where cooling of the solution is brought about in a short time, say two, three or four seconds, the final product, after separation of the same from the soluble salts is coarser, more granular and possesses more desirable physical characteristics than finer grades of similar materials. A further and more important advantage is that the adsorbent properties of the product are greatly enhanced, particularly with respect to the purification of non-acid treated oils.

As noted in the foregoing example, it is preferred to cool the solution from the boiling temperature of around 104-105° C. to about 25-30° C. in as short an interval as practicable, say in about two to four seconds. On the other hand, the solution may be cooled gradually from the boiling temperature of digestion to about 85° C., for example during the filtering operation, and then cooled rapidly to approximate room temperature. In either case, however, to secure good results, the hot solution should be cooled rapidly to a temperature not greater than about 50° C. As to the time interval involved, although it is preferred to effect substantially sudden cooling of the solution, notably improved results are obtained where cooling is accomplished within about five minutes.

In practice, the carbonate digestion may be carried out under such conditions that the carbon dioxide evolved is drawn off and conserved to be turned back into the carbonate solution, either before or after the rapid cooling. In accordance with the present invention the latter procedure is preferred. Following cooling, the major portion of the silica, upwards of about 90%, is precipitated, and substantially all of the silica which would otherwise remain in solution notwithstanding cooling is precipitated on the addition of the carbon dioxide. In order to determine the carbon dioxide loss during digestion, a sample of the filtered carbonate solution is tested on cooling for the presence of sodium silicate, and the carbon dioxide necessary to facilitate complete precipitation of the silica therefrom is determined. The required amount of carbon dioxide is added to the cool carbonate solution as carbon dioxide gas, or in the form of sodium bicarbonate in sufficient quantities to furnish the necessary amount of carbon dioxide. In whatever form the carbon dioxide is added, the quantity thereof should preferably be sufficient to compensate for that lost during digestion, or in other words, the amount of carbon dioxide added should preferably be enough to convert the solution back to a sodium oxide to carbon dioxide molecular ratio of one to one.

After the filtration and removal of the gel from the solution and the replacement in the latter of the carbon dioxide, the solution is returned to the process and utilized in a subsequent carbonate digestion. Since it appears that the presence of organic matter in the alkaline digest solution reduces the effectiveness thereof, as a solvent for silica, the second calcination, prior to alkaline digestion, becomes particularly effective to greatly enhance the efficiency of the process when operating with certain kinds of raw materials which may originally contain more or less organic matter, or in situations where organic matter may have been introduced into the silicious material at some point in the process before digestion in the alkaline solution. Accordingly, where the silicious material is subjected to calcination just prior to the alkaline digestion stage, substantially all of the organic matter contained in the silicious material is removed therefrom, and consequently an accumulation of organic matter in the alkaline digesting solution is prevented. It is apparent that the recurrent dissolution of silica from silicious material and the subsequent regeneration of the alkaline solution, to its initial composition after precipitation of the silica as a gel, takes place within what in effect is a closed circuit which retains organic matter from successive batches of silicious material. Hence, by elimination of organic matter prior to the introduction of the silicious material into the alkaline solution, the present process provides means by which the poisoning and inhibiting effects of accumulations of organic matter in the alkaline solution are overcome and by which the capacity of the alkaline solution for dissolving silica from the silicious material is maintained at the highest efficiency. Elimination of organic matter from the digest solution is of further advantage since the presence of organic substances in the silica product appears to reduce the effectiveness thereof.

The product obtained by successively re-pulping and washing the precipitated silica in water followed by an acid treatment sufficient to substantially completely neutralize any residual sodium carbonate may, after drying, be utilized directly for the decolorization of acid treated oils, and is remarkably efficient for the purification of such oils. However, since the invention comprehends an active silica particularly adapted to decolorize and otherwise purify non-acid treated oils, acidification of the product in the manner described is contemplated. Hence, it is preferred to acidify the silica slurry, after neutralization, to such an extent that the ultimate product contains acid. As noted, an acid content of about 6-8% is preferred, although, depending upon the particular oil being treated, the free acid content of the improved product may vary preferably from about 2 to about 12%, and in the treatment of some oils it may be desirable to employ a product containing less than 1% acid. Acids other than sulfuric, for example hydrochloric, may be employed. Acidity of the product may be determined by boiling a suitable sample, say 2 grams, of the active silica in water for about 15 minutes, cooling the mixture and titrating with tenth-normal sodium hydroxide, using methyl orange as the indicator. Drying of the final product, after separation thereof from the acid slurry, is preferably carried out at a temperature less than about 100° C. say around 95° C., until approximately a constant weight of the product is attained. The loss on ignition of the dried product may be approximately 19-24%.

In the specific example given above, it will be observed that the raw material employed was a clay having the characteristics and approximate composition of kaolinite. The process is particularly adaptable to make use of many different clay materials of this general type and other silicious materials, and contemplates the employment of materials which in either the raw or acid treated state may have little or no adsorbent or purifying properties, and mineral substances which primarily or when subjected to an acid treatment may have some more or less valuable properties as adsorbents and purifying agents.

The carbonate digestion and subsequent phases of the invention are adaptable to the treatment of silicious residues of prior chemical treatments which serve to place the silicious material in similar chemical and physical condition as that acquired by residues resulting from the acid treatment of clays and similar silicates.

One outstanding advantage of the invention is exemplified by the application of the carbonate digestion and subsequent phases of the process to the treatment and utilization of the silicious residue resulting from the acid digestion of clays or other silicates in the manufacture of aluminum sulfate. The manufacture of aluminum sulfate comprises generally the crushing and drying of clay or similar silicate followed by calcination, in order tto render the clay in a condition so as to permit and facilitate the removal of alumina therefrom. The calcined clay is digested in sulfuric acid. The alumina is extracted from the silicate, and appears in the digest liquor as aluminum sulfate. Settling in the digest liquor is facilitated by the use of a coagulant such as glue, and the aluminum sulfate and other acid soluble substances are then separated from the undissolved residue and the latter washed with water. The resultant clay residue is high in uncombined silica, usually containing upwards of 50 to 60% of such substances. This silicious residue from the manufacture of aluminum sulfate heretofore has not only been a waste by-product, but has been an actual charge against the manufacture of aluminum sulfate, because of the expense involved in disposing of the necessarily large quantities of such waste silicious residue. The carbonate digestion aspect of the present invention is particularly adapted to utilize this waste by-product as a raw material because the silica in the clay residue is in such condition as to facilitate dissolution in the hot carbonate solution. When it is considered that the silicious residue of the manufacture of aluminum sulfate has been heretofore a waste by-product, and that the present process itself is such that the reagents employed in the production of the active silica product are substantially completely regenerated, the economic advantages flowing from the present invention are readily apparent. It is to be understood, however, that the invention is in no way limited to the treatment of silicious residues from the manufacture of aluminum sulfate, but that this single application of the invention is given herein by way of example only.

In general, the carbonate digestion phase of the invention is adaptable to the treatment of silicious material containing uncombined silica, whether in a natural state or the residue of a prior chemical process. Any silicious materials resulting from chemical processes, the primary object of which is the extraction of substances other than silica, particularly fulfill the requirements of the invention as to silicious material for the carbonate digestion. However, a most satisfactory product has been obtained from, and it is preferred to utilize for the carbonate digestion, the silicious residue resulting from the treatment of silicates with an acid.

We claim:

1. The method of preparing an active silica which comprises digesting silicious material in a hot alkaline solution, and then cooling the solution in not more than about 5 minutes to precipitate silica therefrom.

2. The method of preparing an active silica which comprises digesting silicious material in a hot alkaline solution, and then cooling the solution in not more than about 5 minutes to a temperature of not more than about 50° C. to precipitate silica therefrom.

3. The method of preparing an active silica which comprises digesting silicious material in a hot alkaline solution, separating undissolved residues from the alkaline solution, and then cooling the hot solution in not more than about 5 minutes to precipitate silica therefrom.

4. The method of preparing active silica which comprises digesting silicious material in a boiling alkaline solution, separating undissolved residues from the solution while maintaining the latter at substantially the boiling temperature, and then cooling the solution from approximately the boiling temperature to about 25° to 30° C. in not more than about 5 minutes to precipitate silica from the solution.

5. The method of preparing an active silica which comprises digesting silicious material in a hot alkaline solution, and then cooling the hot solution in less than about 4 seconds to precipitate active silica therefrom.

6. The method of preparing an active silica which comprises digesting silicious material in a boiling alkali carbonate solution, separating undissolved residues from the solution while maintaining the latter at substantially the boiling temperature, and then cooling the solution from substantially the boiling temperature in less than about 4 seconds to a temperature of about 25 to 30° C. to precipitate silica from the solution.

7. The method of preparing an active silica which comprises digesting acid treated silicious material in a hot alkaline solution, and then cooling the solution in not more than about 5 minutes to precipitate silica therefrom.

8. The method of preparing an active silica which comprises digesting acid treated silicious material in a boiling alkali carbonate solution, separating undissolved residues from the solution while maintaining the latter at substantially the boiling temperature, and then cooling the solution in not more than about 5 minutes to a temperature of not more than about 50° C. to precipitate silica therefrom.

9. The method of preparing an active silica which comprises digesting silicious material in an acid, separating acid-soluble substances from the silicious residue, digesting the silicious residue in a boiling alkali carbonate solution, separating undissolved residues from the solution while maintaining the latter at substantially the boiling temperature, and then cooling the solution from substantially the boiling temperature in less than about 4 seconds to a temperature of about 25 to 30° C. to precipitate silica from the solution.

10. The method of preparing an active silica which comprises digesting silicious material in a hot alkaline solution, separating undissolved residues from the solution while maintaining the latter at substantially the temperature of digestion, rapidly cooling the solution to a temperature of not more than about 50° C., separating the silica from the solution, treating the silica with sulfuric acid and substantially drying the silica, the amount of acid employed being such that the dried silica contains not less than about 2% and not more than about 12% acid.

11. The method of preparing an active silica which comprises digesting silicious material in a boiling alkali carbonate solution, separating undissolved residues from the solution while maintaining the latter at the boiling temperature, cooling the carbonate solution from substantially the boiling temperature in less than about 4 seconds to about 25 to 30° C. to precipitate silica from the solution, separating the silica from the solution, treating the silica with sulfuric acid, and substantially drying the silica, the amount of acid employed being such that the dried silica contains about 6 to 8% acid.

12. The method of preparing an active silica which comprises digesting silicious material in a hot alkaline solution, rapidly cooling the solution to a temperature of not more than about 50° C. to precipitate silica from the solution, forming a water slurry of said silica, adding sulfuric acid to the slurry, dispersing the acid throughout the slurry to thoroughly acidify the slurry, separating the silica from the slurry, and substantially drying the silica, the amount of acid added to the slurry being such that the dried silica contains not less than about 2% acid.

13. The method of preparing an active silica which comprises digesting an acid treated silicious material in a boiling alkali carbonate solution, separating undissolved residues from the solution while maintaining the latter at substantially the boiling temperature, cooling the solution from substantially the boiling temperature in not more than about 5 minutes to a temperature of not more than about 50° C. to precipitate silica from the solution, separating the silica from the solution, forming a water slurry of the silica, adding sulfuric acid to the slurry, dispersing the acid throughout the slurry to thoroughly acidify the silica, separating the silica from the slurry, and substantially drying the silica, the amount of acid added to the slurry being such that the dried silica contains not less than about 2% acid.

14. The method of preparing an active silica which comprises digesting silicious material in sulfuric acid, separating acid-soluble substances from the silicious residue, calcining the residue, digesting the calcined residue in a boiling alkali carbonate solution, separating undissolved residues from the solution while maintaining the latter at substantially the boiling temperature, cooling the carbonate solution from substantially the boiling temperature in less than about 4 seconds to a temperature of about 25 to 30° C. to precipitate silica, separating the precipitated silica from the cooled solution, forming a water slurry of the silica, adding sulfuric acid to the slurry, dispersing the acid throughout the slurry to thoroughly acidify the silica, separating the silica from the slurry, and substantially drying the silica, the quantity of acid added to the slurry being such that the dried silica contains about 6 to 8% sulfuric acid.

15. The method of preparing an active silica which comprises digesting silicious material in a hot alkali metal carbonate solution, cooling the solution in not more than about 5 minutes to precipitate silica therefrom, and treating the solution with carbon dioxide.

16. The method of preparing an active silica which comprises digesting silicious material in a hot alkali metal carbonate solution, cooling the solution in not more than about 5 minutes to precipitate silica therefrom, and treating the solution with carbon dioxide in amount substantially equal to that lost during digestion.

17. The method of preparing an active silica which comprises digesting silicious material in a hot alkali metal carbonate solution, cooling the solution in not more than about 5 minutes to precipitate silica therefrom, and treating the solution with carbon dioxide in amount such that the ratio of carbon dioxide to sodium oxide in the solution will not be substantially less than one to one.

18. The method of preparing an active silica which comprises digesting silicious material in a hot alkaline solution, cooling the solution in not more than about 5 minutes to precipitate silica therefrom, separating the silica from the solution, treating the silica with an acid, the amount of acid employed being such that the silica when dried contains not less than about 2% acid.

HERBERT J. WOLLNER.
JOHN V. SHINN.